(12) United States Patent
Kikuchi et al.

(10) Patent No.: US 6,274,255 B1
(45) Date of Patent: Aug. 14, 2001

(54) COMPONENT FOR INTERIOR DECORATION OF AIRCRAFT, AND METHOD OF MANUFACTURING THE SAME

(75) Inventors: Hiroaki Kikuchi; Tomio Hayakawa, both of Tokyo (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 09/438,474

(22) Filed: Nov. 12, 1999

(30) Foreign Application Priority Data

Feb. 23, 1999 (JP) .................................... 11-044170

(51) Int. Cl.$^7$ ...................................... B32B 19/00

(52) U.S. Cl. ...................... 428/689; 428/212; 156/272.2; 156/182; 156/307.1

(58) Field of Search ..................................... 156/173, 175, 156/172, 574, 523, 182, 272.2, 272.6, 307.1, 322; 428/692, 689, 461

(56) References Cited

U.S. PATENT DOCUMENTS

| | | |
|---|---|---|
| 3,919,035 | 11/1975 | Warrach . |
| 4,746,385 | 5/1988 | Wagner et al. . |
| 6,048,622 * | 4/2000 | Hagood, IV et al. ................ 428/461 |
| 6,050,315 * | 4/2000 | Deckers et al. ....................... 156/433 |

\* cited by examiner

Primary Examiner—Merrick Dixon
(74) Attorney, Agent, or Firm—Armstrong, Westerman, Hattori, McLeland & Naughton, LLP

(57) ABSTRACT

A surface material is provided with a first adhesive layer formed by applying a first adhesive composed of a soluble self-digesting adhesive to an adhesive surface and a second adhesive layer formed by applying a second adhesive composed of a two-part synthetic resin contact adhesive to the upper surface of the first adhesive layer. A base material is provided with a base material adhesive layer formed by applying a second adhesive composed of a two-part synthetic resin contact adhesive to an adhesive surface, and having a composition of adhering the second adhesive layer of the surface material and the base material adhesive layer of the base material.

4 Claims, 4 Drawing Sheets

COMPONENT FOR INTERIOR DECORATION OF AIRCRAFT, AND METHOD OF MANUFACTURING THE SAME

BACKGROUND OF THE INVENTION

1. Field of the Invention

The present invention relates to an interior component decorated with a vinyl leather which is used as a surface decoration of an interior of an aircraft, and more specifically, relates to an interior component having the required combustion characteristics, and the method of manufacturing the same.

2. Description of the Prior Art

Heretofore, a combustion characteristic is regulated as one of the requirements for an interior decoration of an aircraft, in order to prevent fire from occurring in case of an aircrash and the like.

As an interior of an aircraft, such as a console, it may be required to decorate the surface of an aluminum plate which is a base material with a vinyl leather as a surface material.

The structure of an interior component recommended by manufacturers of vinyl leather is explained according to FIG. 3.

An interior component 10 comprises a vinyl leather 15 pasted as a surface material to an aluminum plate 11 through a soluble self-digesting adhesive 13.

The adhesing strength of the aluminum plate 11 and the vinyl leather 15 of the interior component 10 is weak, and inconveniences such as exfoliation of the surface material (vinyl leather) occurred during combustion test.

SUMMARY OF THE INVENTION

Also, combustion index to time is experimented using the interior component 10 having the above-mentioned structure. The result is shown in FIG. 4.

The graph shows the relation between time and thermal energy when thermal energy is provided to the interior component 10. According to this graph, the component 10 reached the peak value of 80.87 kW/m$^2$ at approximately 20 seconds after heating.

A regulation concerning heat value during a combustion is provided to the materials of this kind in an aircraft. According to the regulation, the peak heat value should be 65 kW/m or less, and total heat value should be 65 kW min/m$^2$ or less.

The total heat value to time according to the above-mentioned experiment is shown in TABLE 1.

TABLE 1

| | Time (minutes) | | | | (unit: kW · min/m$^2$) |
|---|---|---|---|---|---|
| sample | 00:30 | 01:00 | 02:00 | 03:00 | 05:00 |
| 1 | 15.92 | 20.47 | 27.01 | 35.22 | 55.89 |

From the experiment, the conventional interior component 10 showed the total heat value of 65 kW·min/m$^2$ or less and is within the range of the regulation. However, the peak heat value exceeded the regulation, and moreover, reached the peak heat value at such a short period of time as 20 seconds.

That is, when fire occurs, the interior equipped in an aircraft reaches the peak heat value in a short period of time, and there is not enough time for passengers to escape. Therefore, it cannot be used as the interior of an aircraft alone.

The present invention provides an interior component which could maintain the total heat value within the regulation, lowers the peak heat value, as well as delaying the time before reaching the peak heat value. Moreover, it provides a method of manufacturing an interior component which could improve productivity by securing the adhesive strength of a surface material.

A component for decorating the interior of an aircraft composed by adhering a surface material for decorating the surface of a base material according to the present invention comprises a first adhesive layer formed by applying a first adhesive on the adhesive layer, a surface material having a second adhesive layer formed by applying a second adhesive to the upper surface of the first adhesive layer, and a base material adhesive layer formed by applying the second adhesive to the adhering surface of the base material, which are adhered together.

The first adhesive is a soluble self-digesting adhesive, the second adhesive is a contact adhesive of a two-part synthetic resin. The first adhesive layer has a thicker layer compared to the second adhesive layer, and also has a filling effect of the surface material.

The method of manufacturing the interior component of an aircraft according to the present invention consists of a first adhesive layer forming step where a first adhesive consisting of a soluble self-digesting adhesive is applied to the adhering surface of the surface material, a second adhesive layer forming step where a second adhesive consisting of a contact adhesive of two-part synthetic resin is applied to the upper surface of the first adhesive layer, a base material adhesive layer forming step where the second adhesive consisting of a contact adhesive of two-part synthetic resin is applied to the adhering surface of the base material, and an adhering step where the second adhesive layer of the surface material and the adhesive layer of the base material are adhered.

PREFERRED EMBODIMENT OF THE INVENTION

Figure 1:
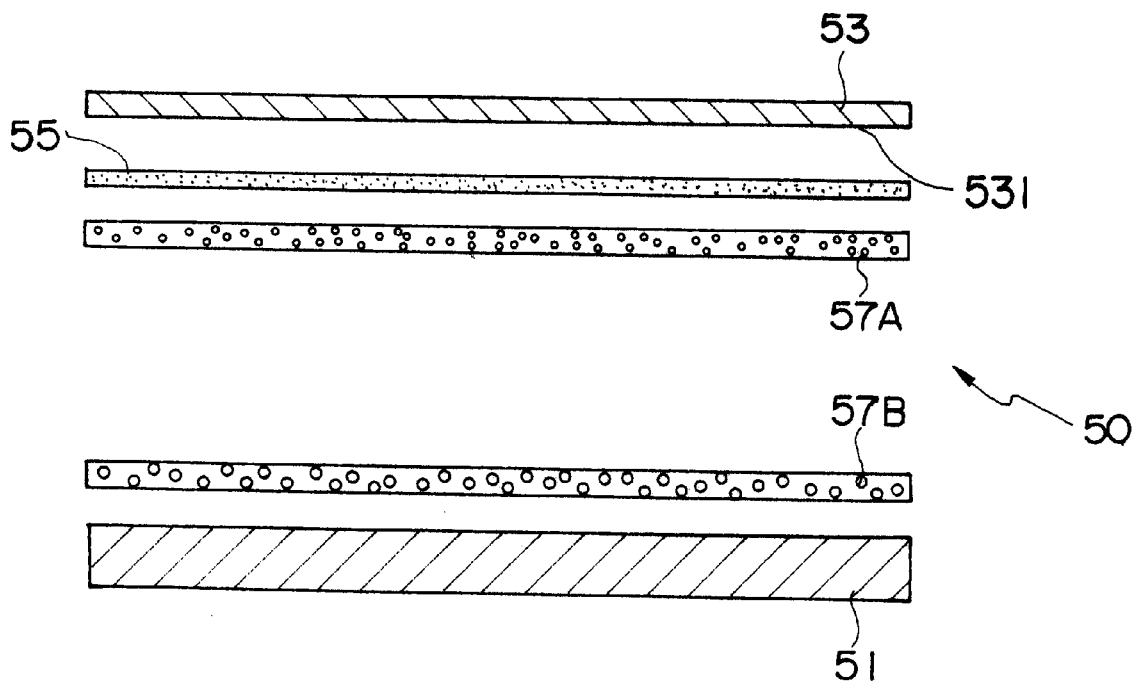
FIG. 1 is an explanatory view showing the structure of the interior component according to the present invention.

An embodiment of a component for decorating the interior of an aircraft according to the present invention is shown in FIG. 1.

The component 50 for interior decoration shown in the example is composed by pasting a vinyl leather 53 for surface decoration to an aluminum plate 51 being a base material through an adhesive.

As the adhesive constituting a first adhesive layer 55, a soluble self-digesting adhesive, such as AQUABID (trademark) is used.

The first adhesive layer 55 is formed by spraying a soluble self-digesting adhesive to an adhesive surface 531 of a vinyl leather 53. The first adhesive layer 55 formed by being applied to the adhesive surface 531 of the vinyl leather 53 has a filling effect of the adhesive surface 531 of the vinyl leather 53.

After drying the first adhesive layer 55, a second adhesive layer 57A is formed by applying a second adhesive on top of the first adhesive layer 55. Moreover, a base material adhesive layer 57B is formed by applying the second adhesive to an adhesive surface of an aluminum plate 51 which is the adhering object. Adhering is conducted by pasting the second adhesive layer 57A of the vinyl leather 53 of the aluminum plate 51 to the base material adhesive layer 57B, and heating the surface of the vinyl leather 53.

The second adhesive used herein is a two-part polyester resin based contact adhesive, such as BOSTIK (trademark).

As explained, in an interior component 50 where vinyl leather 53 having a first adhesive layer 55 formed thereto is adhered to the aluminum plate 51 through the second adhesive layer 57A and the base material adhesive layer 57B, the adhering strength of the vinyl leather 53 to the aluminum plate 51 is strong, and exfoliation may be prevented.

Figure 2:
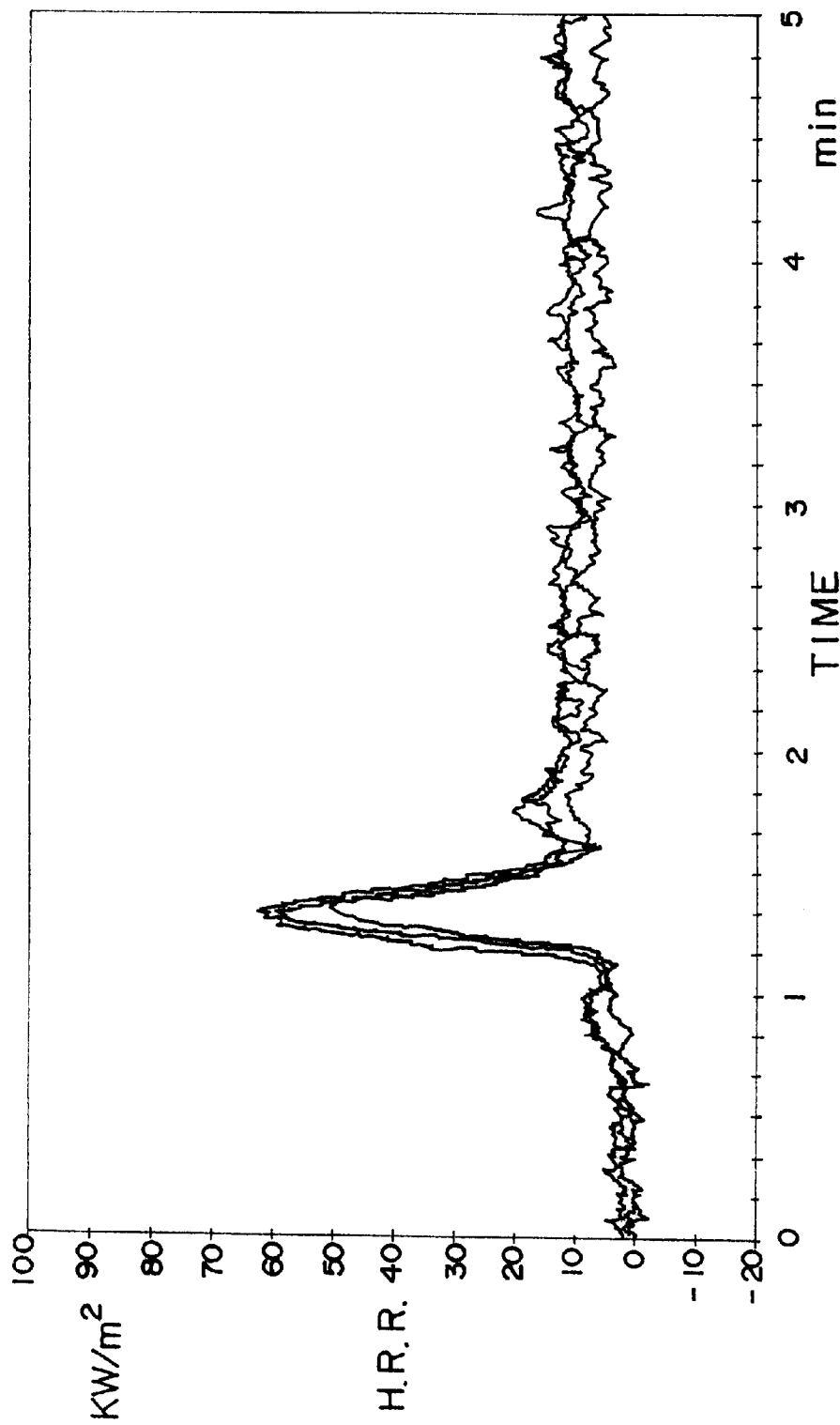
FIG. 2 is a graph showing the heat value to time of the interior component of the present invention.
Figure 3:
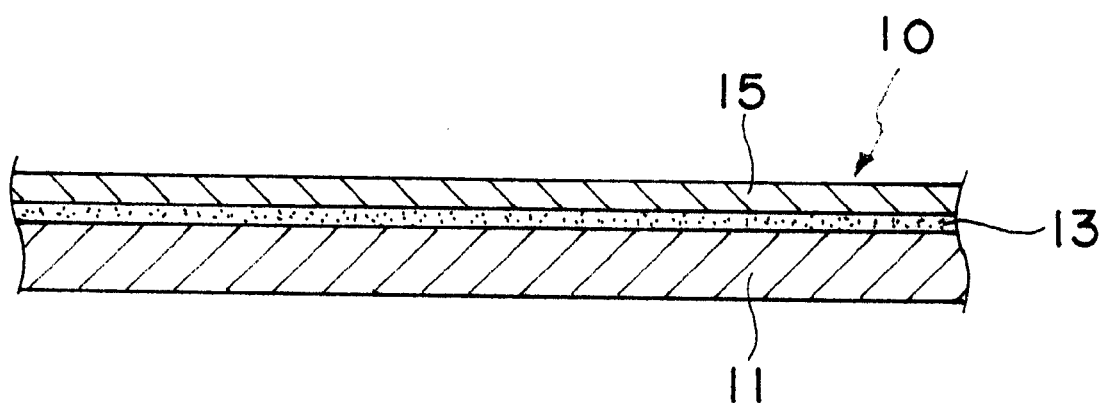
FIG. 3 is a cross-sectional view of the conventional interior component.
Figure 4:
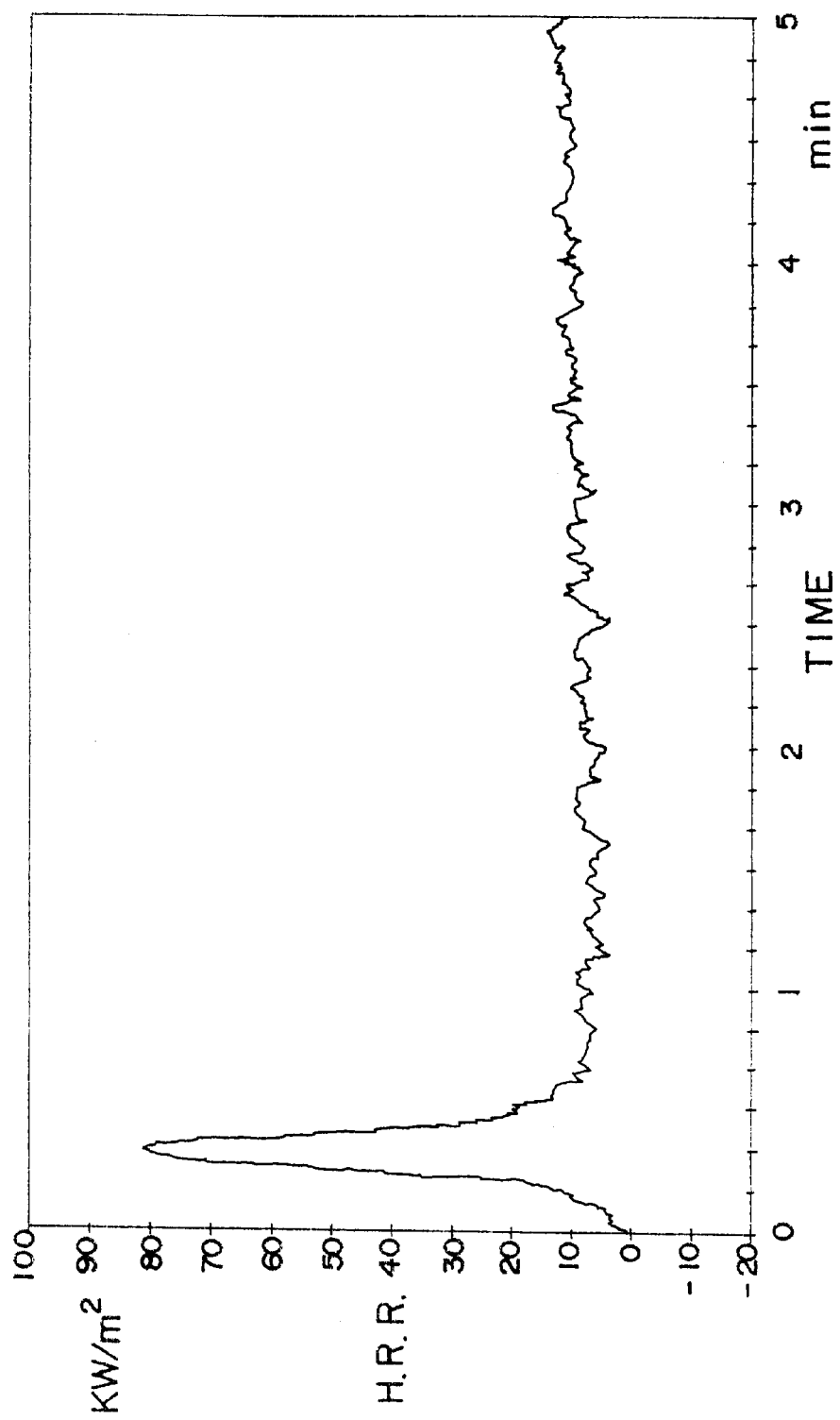
FIG. 4 is a graph showing the heat value to time of the conventional interior component.

The relation between the heat value to time of the interior component of the present invention has been observed. The result is shown in FIG. 2.

Three pieces of samples are taken from three places of the component, and each test piece is tested of the total heat value per time, and the period of time which shows the highest heat value. The result of the test is shown in TABLE 2.

TABLE 2

| | Time (minutes) | | | | (unit: kW · min/m$^2$) |
|---|---|---|---|---|---|
| sample | 00:30 | 01:00 | 02:00 | 03:00 | 05:00 |
| 1 | 0.06 | 0.92 | 17.50 | 24.79 | 37.00 |
| 2 | 1.21 | 3.43 | 25.52 | 36.68 | 58.01 |
| 3 | 0.93 | 3.38 | 24.88 | 36.40 | 59.28 |
| average | 0.74 | 2.58 | 22.64 | 32.62 | 51.43 |

As shown in the table, each of three test pieces composed of the component of the present invention shows the total heat value (kW·min/m$^2$) up to 5 minutes of less than 60 kW·min/m$^2$, and the highest heat value (kW/m$^2$) of lower than 60 kW/m$^2$.

The period of time until the highest heat value is shown in TABLE 3.

TABLE 3

| sample | peak kW/m$^2$ | peak time (minute) |
|---|---|---|
| 1 | 50.24 | 01:21 |
| 2 | 61.55 | 01:17 |
| 3 | 62.43 | 01:20 |
| average | 5B.08 | 01:19 |

As shown in the table, the period of time for highest heat value averages at 1 minute 19 seconds, and the time for highest heat value is delayed for approximately 1 minute compared to the conventional component. Moreover, the surface material did not exfoliate during combustion test.

Now, the method for manufacturing the interior component will be explained.

First Step

The first adhesive layer 55 is formed by applying the first adhesive which is a soluble self-digesting adhesive (for example, AQUABIND (Trademark)) to one side which becomes the adhesive surface of the vinyl leather 53 which is a surface decorative material.

The first adhesive layer 55 is applied by mixing and stirring the soluble self-digesting adhesive which is the first adhesive and water. The mixing ratio of the soluble self-digesting adhesive to water is adhesive 2 to water 1 in weight ratio. By using a spray gun, applying is carried out uniformly with an applying amount of 2.7 kg to a 1 m$^2$ area (27 g for 100 cm$^2$) of the vinyl leather 53.

Second Step

After application of the first adhesive, the water of the first adhesive layer 55 is evaporated completely by leaving the material for 24 hours under the condition of room temperature and humidity of less than 60%.

The determination of dryness is carried out through eye examination by checking the adhesive applied surface of the vinyl leather for any wet portion, or according to another method, it is determined to be completely dry when adhesive is powdered by folding the vinyl leather.

In order to shorten the drying time, drying is carried out by heating uniformly in the oven of less than 40° C.

Third Step

The second adhesive is applied on the upper surface of the dried first adhesive layer 55 of the vinyl leather 53 and the adhesive surface of the aluminum plate 51.

As the second adhesive 57, a two-part polyester resin based contact adhesive and a softening agent (for example, BOSCODUR 24 (Trademark)) is mixed at a weight ratio of 100:8. A second adhesive layer 57A and a base material adhesive layer 57B is formed by applying the adhesive uniformly to the upper surface of the dried first adhesive layer 55 of the vinyl leather 53 and the adhesive surface of the aluminum plate 51 with an applying amount of 32 to 55 g for 1 m$^2$. The weight of the adhesive is the weight after evaporation of the solvent.

Fourth Step

The second adhesive layer 57A side of the vinyl leather 53 is polymerized to the base material adhesive layer 57B side of the aluminum plate 51, and by drying the adhesive by providing warm air from the upper surface of the vinyl leather 53 with a heat gun, adhering of the aluminum plate 51 and the vinyl leather 53 is completed.

The interior component 50 manufactured by the process shows a property satisfying the limitations provided for the interior of the aircraft, such as adhering strength of the surface decorating material, heat value during combustion (peak heat value, total heat value), and period of time before reaching the highest heat value and the like.

Moreover, the present adhering method may adhere large areas with a uniform adhering strength.

The component for decorating the interior of an aircraft according to the present invention maintains the total heat value within the regulation, lowers the peak heat value, and delays the period of time before reaching the peak heat value. Further, productivity is improved by securing the adhering strength of the surface material.

Moreover, the manufacturing method of the component is suitable for adhering large areas or adhering parts having two-dimensional or three-dimensional shapes.

We claim:

1. A component for the interior decoration of an aircraft comprising:
    a surface material;
    a first adhesive layer formed by applying a first adhesive to an adhering surface of said surface material;
    a second adhesive layer formed by applying a second adhesive to an upper surface of said first adhesive layer of said surface material;
    a base material; and
    a base material adhesive layer, located between the second adhesive layer and the base material and formed by applying said second adhesive to an adhering surface of said base material;
    said surface material is adhered to said base material through three adhesive layers
    and under combustion conditions the time to reach the peak heat value measured in KW·min/m$^2$ is more that one minute.

2. A component for the interior decoration of an aircraft according to claim 1, wherein said first adhesive is a soluble self-digesting adhesive, said second adhesive is a contact adhesive of two-part synthetic resin, characterized in that said first adhesive layer is formed to be thicker than said second adhesive layer, and said first adhesive layer functions as a filler for said surface material.

3. A method of manufacturing a component for the interior decoration of an aircraft composed by adhering to a base material a surface material for surface decoration, comprising the steps of:
    a first adhesive layer forming step of applying a first adhesive to an adhering surface of said surface material;
    a second adhesive layer forming step of applying a second adhesive to an upper surface of said first adhesive layer;
    a base material adhesive layer forming step of applying a base material adhesive to an adhering surface of said base material; and
    an adhering step of adhering said base material adhesive layer of said base material and said second adhesive layer of said surface material; and
    heating the surface material;
    said first adhesive used in said first adhesive layer forming step is a soluble self-digesting adhesive, and said second adhesive used in said second adhesive forming step and said base material adhesive applying step is a contact adhesive of a two-part synthetic resin;
    said surface material is adhered to said base material through three adhesive layers,
    and under combustion conditions the time to reach the peak highest heat value measured in KW·min/m2 is more that one minute.

4. A component for the interior decoration of an aircraft comprising:
    a surface material of vinyl leather;
    a first soluble self-digestive adhesive layer formed by applying a first adhesive to an adhering surface of said surface material;
    a second two-part polyester resin based contact adhesive layer formed by applying a second adhesive to an upper surface of said first adhesive layer of said surface material;
    a base material of aluminum; and
    a base two-part polyester resin adhesive layer, located between the second adhesive layer and the base material and formed by applying said second adhesive to an adhering surface of said base material;
    said surface material is adhered to said base material through three adhesive layers,
    and under combustion conditions the time to reach the peak heat value measured in KW·min/m$^2$ is more that one minute.

* * * * *